UNITED STATES PATENT OFFICE.

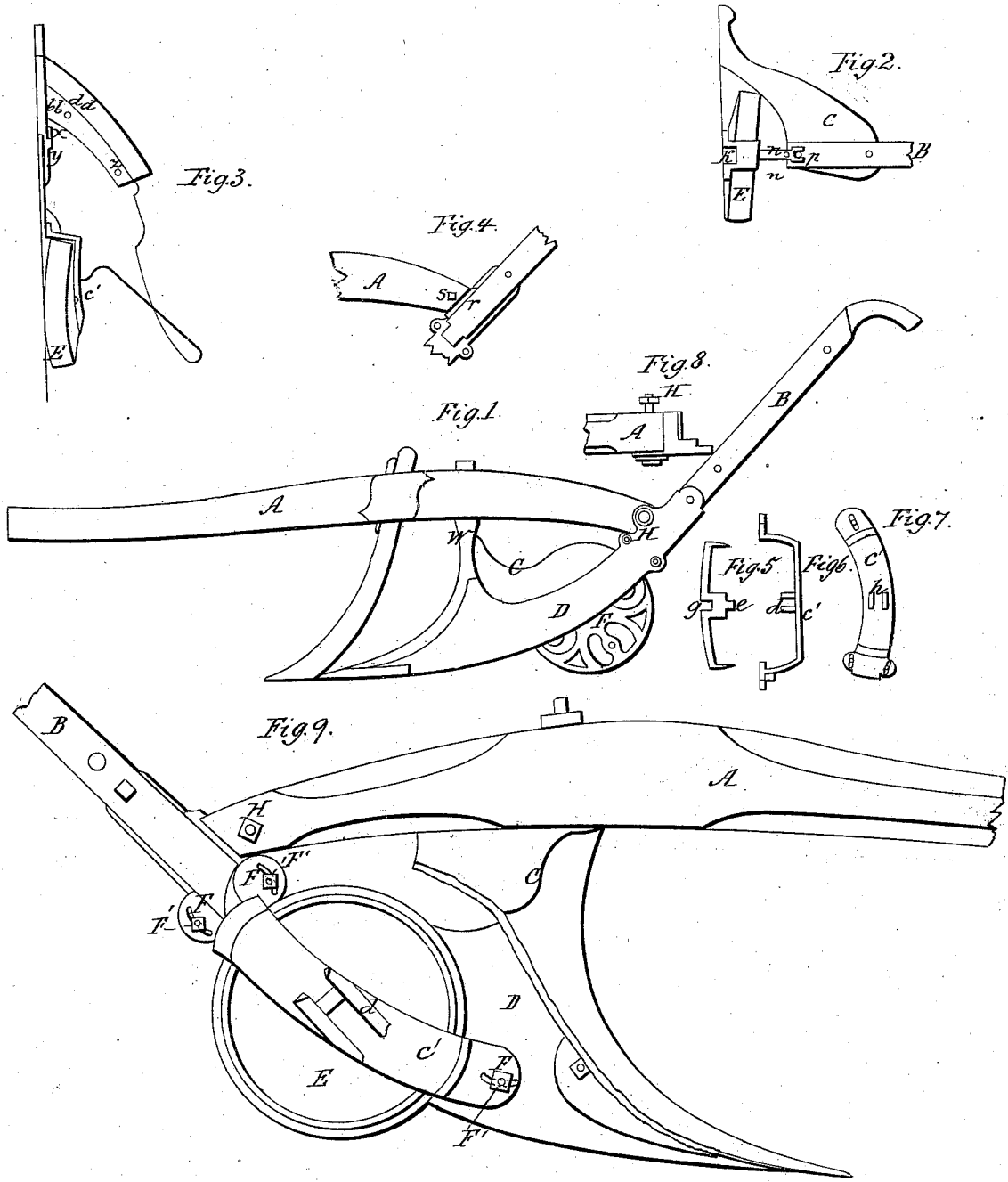

THO. B. QUIGLEY AND HARVEY HALL, OF MANSFIELD, OHIO.

IMPROVEMENT IN WHEEL-PLOWS.

Specification forming part of Letters Patent No. 4,222, dated October 7, 1845.

*To all whom it may concern:*

Be it known that we, THOMAS B. QUIGLEY and HARVEY HALL, of the town of Mansfield, in the county of Richland and State of Ohio, have invented an Improvement in the Wheeled Plow, which is described as follows, reference being had to the annexed drawings of the same, making part of this specification.

Figure 1 is a side elevation. Fig. 2 is a horizontal section. Fig. 3 is a view of the under side of the plow. Fig. 4 is a sectional view, showing the box and bolt by which the rear end of the beam is attached to the handle and landside and made adjustable for taking more or less landside. Fig. 5 is a sectional view of the box in which one end of the axle of the wheel turns. Fig. 6 is a sectional view of the adjustable brace-plate containing the box to receive the other end of the axle of the wheel. Fig. 7 is a top view of the same. Fig. 8 is a top view of the end of the beam and landside. Fig. 9 is a side elevation of a part of the plow, a portion of the mold-board being removed in order to show the mortised ends of the adjustable plate and the screw-bolts by which it is secured in the required position.

The plow is in most of its parts made like other plows in use, such as the beam A, handles B, mold-board C, landside D, and wheel E.

The improvements are principally in the construction and arrangement of the plate $C'$ containing the outer box for the end of the axle of the wheel to turn in; also, the construction and arrangement of the apparatus for adjusting and securing the end of the beam to the handle and cause the plow to take more or less land.

The plate $C'$, Figs. 6, 7, and 9, is made the segment of a circle of greater diameter than that of the wheel, and is shaped to correspond with the form, face, and edge of the wheel over which it is placed, the ends of said plate having oblong openings made therein to admit screw-bolts F, by which the said plate is held at any desired position, the oblong openings or slits permitting the said plate to be moved for the purpose of adjustment by loosening the nuts $E'$. This plate $C'$, as before stated, contains the box $d$, in which the end of the axle of the wheel E turns. When the plate $C'$ is moved the axle of the wheel (which is permanently fixed in the wheel) will have its position changed with that of the wheel fixed thereto, and such change of the wheel becomes necessary at every change of the position of the beam for taking more or less land, and hence the necessity of having the adjustable plate $C^2$ and box aforesaid for the axle of the wheel such as that above described. The wheel is made beveling on its periphery toward the mold-board for the purpose of crowding the rear of the mold-board from the land and keeping the front of the plow toward the land. The use of the wheel is the same as in other wheeled plows—namely, to reduce the friction - guide and steady the plows.

H is a screw-bolt attached to the landside, and turned by a wrench in a permanent nut let into the beam for moving the rear end of the beam to the right or left to cause the plow to take more or less land.

What we claim as our invention and improvement, and desire to secure by Letters Patent, is—

The combination of the adjustable wheel with the adjustable beam, as described.

THOMAS B. QUIGLEY.
HARVEY HALL.

Witnesses:
ALANSON ALLEN,
JOSEPH S. SIMMONS.